United States Patent [19]
Hileman et al.

[11] Patent Number: 6,144,553
[45] Date of Patent: Nov. 7, 2000

[54] REFRIGERATION COOLED DISK STORAGE ASSEMBLY

[75] Inventors: Vince P. Hileman, San Jose; Gary A. Harpell, Menlo Park, both of Calif.

[73] Assignee: Sun Microsystems, Inc., Palo Alto, Calif.

[21] Appl. No.: 09/150,279

[22] Filed: Sep. 9, 1998

[51] Int. Cl.[7] ................................................. H05K 7/20
[52] U.S. Cl. .................. 361/687; 62/259.2; 165/104.33; 361/700
[58] Field of Search .................... 174/16.3, 15.2; 62/259.2, 331, 376; 165/80.3, 80.4, 104.33, 104.34; 361/687, 699, 700, 695, 717–719, 697

[56] References Cited

U.S. PATENT DOCUMENTS

| | | |
|---|---|---|
| 3,971,435 | 7/1976 | Peck . |
| 4,493,010 | 1/1985 | Morrison . |
| 4,805,420 | 2/1989 | Porter et al. . |
| 4,860,163 | 8/1989 | Sarath . |
| 4,866,570 | 9/1989 | Porter . |
| 4,950,181 | 8/1990 | Porter . |
| 4,953,060 | 8/1990 | Lauffer et al. . |
| 5,040,053 | 8/1991 | Porter et al. . |
| 5,058,389 | 10/1991 | Yasuda et al. . |
| 5,073,838 | 12/1991 | Ames . |
| 5,218,514 | 6/1993 | Huyuh . |
| 5,343,358 | 8/1994 | Hillbrink . |
| 5,343,360 | 8/1994 | Sanwo . |
| 5,390,077 | 2/1995 | Paterson . |
| 5,398,161 | 3/1995 | Roy . |
| 5,414,591 | 5/1995 | Kimura et al. . |
| 5,436,793 | 7/1995 | Sanwo et al. . |
| 5,473,508 | 12/1995 | Porter et al. . |
| 5,475,562 | 12/1995 | Gow . |
| 5,563,768 | 10/1996 | Perdue . |
| 5,576,932 | 11/1996 | Bishop et al. . |
| 5,596,483 | 1/1997 | Wyler . |
| 5,653,280 | 8/1997 | Porter . |

FOREIGN PATENT DOCUMENTS 0 309 279  3/1989  European Pat. Off. .

*Primary Examiner*—Gerald Tolin
*Attorney, Agent, or Firm*—O'Melveny & Myers LLP

[57] ABSTRACT

A refrigeration system for a disk drive storage is provided. The refrigeration system employs pairs of thin conducting plates, each pair of which is placed so as to sandwich a disk drive. The refrigeration system conducts heat generated from the disk drives via the thin conducting plates, heat pipes coupled to the thin conducting plates, a back plate and a chilled manifold. The heat is further removed as a refrigerant travels through to a compressor and then to a condenser, both of which are connected to the chilled manifold. In this way, the disk drive storage is able to increase its capacity from a bank of twelve disk drives to fourteen disk drives for a 1 inch disk drive storage and from eight disk drives to nine disk drives for a 1.6 inch disk drive storage system, thereby realizing an increased density system without sacrificing a low operating temperature.

18 Claims, 6 Drawing Sheets

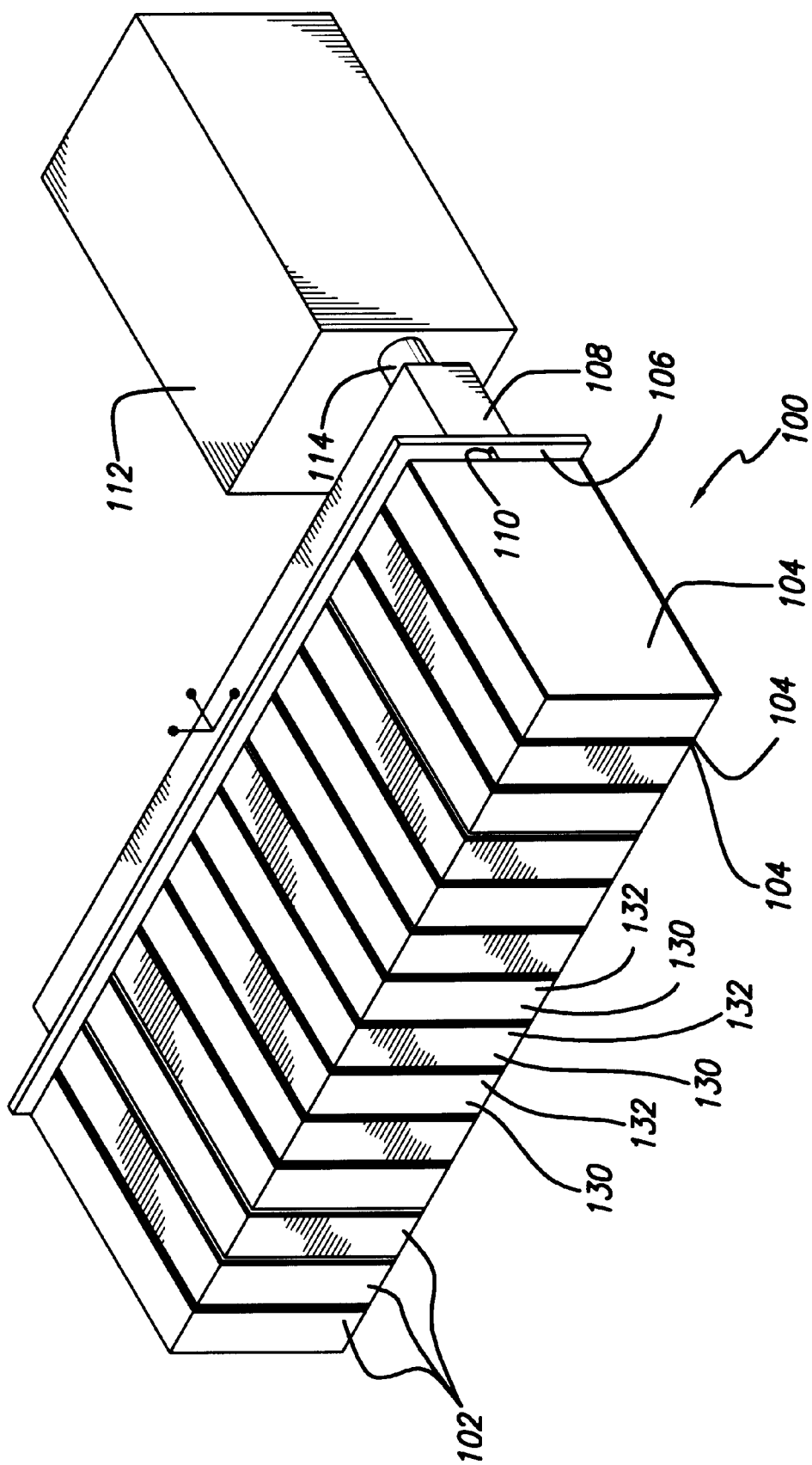

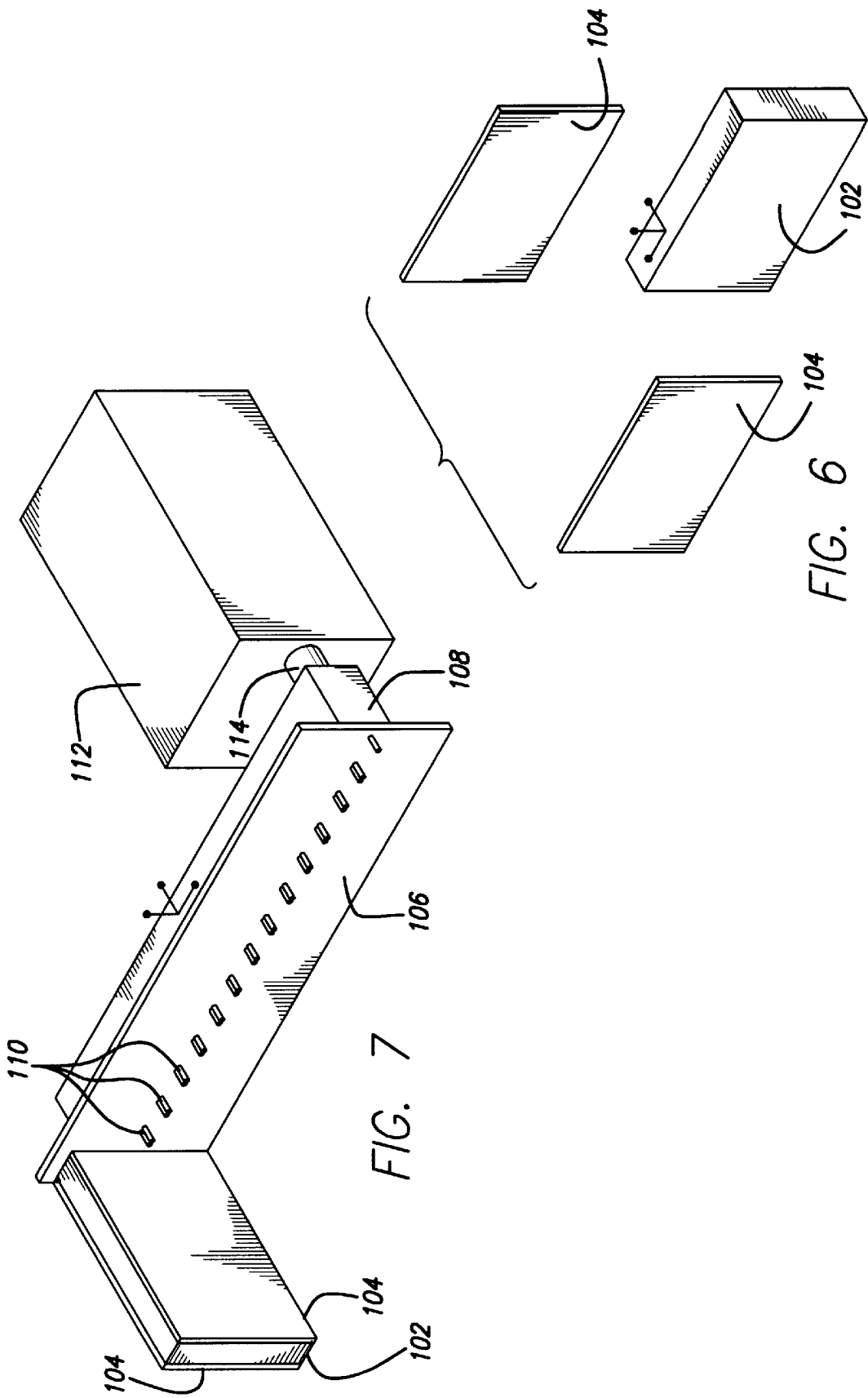

REFRIGERATION COOLED DISK STORAGE ASSEMBLY

BACKGROUND OF THE INVENTION

1. Field of the Invention

The present invention relates to a cooling mechanism and, more particularly to an apparatus for cooling disk drives in a mass storage computer system.

2. Background

It is well known that the performance of certain electronic devices can be improved by cooling them to a low temperature. Some manufacturers require that a component be kept below a predetermined temperature level.

In the area of mass storage products, there is a pressure to provide higher density products. Considerations must be given at the same time to maintaining or even decreasing the physical space requirement without sacrificing reliability. Currently, the state of the cooling technology for disk drives is such that twelve 1 inch drives are stored in one enclosure to meet the operating conditions. For storage of 1.6 inch drives, a maximum of eight drives can be stored in one enclosure.

The motor, spindle, and the like of a head disk assembly create a significant amount of heat. Reliability of disk drives depends a great deal on the condition of the grease used on the spindle bearing. If the temperature of the grease increases past a certain level, it breaks down and ceases to provide the required lubrication for a proper operation of the spindle motor. For Sun StorEdge A1000 (StorEdge is a trademark or a registered trademark of Sun Microsystems, Inc.), for example, the operating temperature range is 5° C. to 35° C. (50° F. to 95° F.), and the non-operating temperature range is −20° C. to 60° C. (−4° F. to 140° F.) with certain relative humidity requirement. However, preferably the temperature is maintained at or below 55° C.

A conventional forced air system like Sun StorEdge A1000 is employed to cool disk drives, controller cards of the disk drives and head disk assemblies. FIG. 1 shows a top interior view of a disk drive storage enclosure 10 using a forced air system. The disk drive storage enclosure 10 has a capacity for twelve 1 inch disk drives in the front section 14 thereof. A given disk drive is placed at a predetermined interval from the adjacent disk drive. In the front of the disk drive storage enclosure 10, ventilation openings are provided on a front door (not shown.)

In the rear of the disk drives 12 between the front section 14 and a rear section 20 of the disk drive storage enclosure 10, a center plane 18 is provided. Multiple elongated slit-like openings (not shown) are provided in the center plane 18 for air flow between the front section 14 and the rear section 20.

The disk drive storage enclosure 10 houses four centrifugal air blowers 22, 24, 26, 28 against right and left side walls 30, 32, respectively, of the rear section 20. The left air blowers 22, 24 are placed somewhat offset with respect to each other as shown in FIG. 1. The right air blowers 26, 28 are placed similarly as shown in FIG. 1.

Two power supplies 34, 36 are provided side by side in the rear section 20 of the disk drive storage enclosure 10. The power supplies 34, 36 are shaped like rectangular boxes that extend from the center plane 18 to the rear of the disk drive storage enclosure 10. The power supplies 34, 36 occupy roughly half of the internal height of the storage enclosure 10 as shown in FIG. 2.

Air flow through the disk drive storage enclosure 10 is described below. The four centrifugal air blowers 22, 24, 26, 28, when in operation, create a negative pressure inside the disk drive storage enclosure 10. The negative pressure causes outside air to be drawn into the enclosure 10 through the ventilation openings in the front door. The air flows through spaces 16 between the disk drives 12 in the front section 14 of the enclosure 10 removing heat from the controller cards and the head disk assemblies of the disk drives.

In the rear section 20 of the disk drive storage enclosure 10, there are two types of air flows: a top air flow indicated by top air flow passages 60, 61, 62 and 63 and a bottom air flow indicated by bottom air flow passages 64, 66. The bottom air flow passages 64, 66 enter the respective power supplies 34, 36 through front power supply ventilation openings 65, 67, respectively. More specifically, the left bottom air flow passage 64 is created by the air flow which starts from the center plane 18, goes through the power supply 34 and is exhausted through a rear power supply ventilation opening 50 of the power supply 34. The ventilation opening 50 is provided on a rear quarter of a top surface of the power supply 34. The bottom left air flow passage 64 also includes an air flow into the rear air blower 24 which exits to the ambient air through an exhaust opening 54.

Similarly, the bottom air flow passage 66 corresponds to a bottom right air flow which starts from the center plane 18, goes through the power supply 36, and is exhausted through a power supply ventilation opening 52 provided in a rear quarter of a top surface of the power supply 36. The bottom right air flow passage 66 extends further to the rear air blower 28 and leaves the enclosure 10 through an exhaust opening 56 into ambient air.

The top air flow creating the top air flow passages 60, 61, 62, 63 is drawn into the rear section 20, and virtually bypasses the power supplies 34, 36. All of the air that comes through the center plane 18 to the aft side of the center plane 18 enters one of the centrifugal air blowers 22, 24, 26, 28 and is exhausted through one of the exhaust openings 54, 56.

More specifically, the top right air flow passage 62 indicates an air flow which enters the rear section 20 via the center plane 18, then flows through the centrifugal air blower 26 and around the air blower 28, and is finally exhausted into ambient air through the exhaust opening 56 in the rear of the disk drive storage enclosure 10. The other top right air flow passage 63 permits a smaller air flow than that of the air flow passage 62, and enters the rear air blower 28. The top left air passage 60 indicates an air flow which enters the rear section 20 from the center plane 18, and flows through the centrifugal air blower 22 and around the air blower 24. The top left air flow passage 60 further extends through the ventilation opening 54 in the back of the disk drive storage enclosure 10. The other top left air flow passage 61 enters the air blower 24 directly and is a smaller volume air flow than that of the top left air flow passage 60.

The particular placement of the centrifugal air blowers 22, 24, 26, 28 in the disk drive storage enclosure 10 provides a packaging improvement over a conventional tube axial fans because the direction of the exhaust air from any of the centrifugal blowers 22, 24, 26, 28 is perpendicular to the direction of the inlet air thereto. In an axial fan, the direction of the inlet and exhaust air are essentially in line.

There are, however, problems with the above conventional forced air cooling system of FIGS. 1 and 2 in that there is a pressure to run the disk drives faster and faster in the industry. When the disk drives are run faster, the amount of heat generated also increases. If the cooling capacity remains the same, then the number of disk drives must be decreased to maintain the proper temperature. This of course is not the direction the technology is moving. The trend is to provide higher density products.

FIG. 3 shows another type of conventional cooling system utilizing a pin fin heat sink member 84 and an impingement fan 89. A disk drive 85 is shown with a head disk assembly (HDA) 82 on the right hand side and a controller card 80 on the left hand side. The pin fin heat sink member 84 is made of aluminum and is placed adjacent to, and in parallel with, the head disk assembly 82. The pin fin heat sink member 84 is a generally thin flat member having a smooth back side 86 and a front side 88. The front side 88 has multiple stud-like protrusions 90 provided in an orderly manner as shown in FIG. 4. Each of the protrusions 90 has a rectangular cross-section. Profile of the protrusions, however, could be any shape including circular, eliptical and others.

The impingement fan 89 is provided next to the pin fin heat sink member 84. It is placed in such a way that air 92 flows through the impingement fan 89 against the pin fin heat sink member 84. Once the air 92 hits the pin fin heat sink member 84, it flows substantially parallel thereto amongst the protrusions 90 in the direction away from the center of the pin fin heat sink member 84, as indicated by arrows 93.

The cooling system using a pin fin heat sink and an impingement fin is more efficient than the forced air cooling system. It provides more cooling with more accuracy and reliability. However, the pin fin heat sink/fan system has a drawback in that the provision of the pin fin heat sink and the impingement fan adds to the thickness of each disk, adding a significant bulk to the overall hard disk array.

SUMMARY OF THE INVENTION

A disk storage array according to the present invention employs a cooling system including pairs of thin conducting plates, heat pipes attached to the thin conducting plates, a back plate and a chilled manifold, a compressor and a condenser. A pair of thin conducting plates sandwich a corresponding disk drive, and each conducting plate is connected to a heat pipe. When the conducting plates get heated from the heat generated by the disk drives, the heat is then transferred to the chilled manifold via the heat pipes. A refrigerant is circulated in the chilled manifold, the compressor, and the condenser and the heat is further removed from the disk drive array by evaporation.

BRIEF DESCRIPTION OF THE DRAWINGS

FIG. 5 is a plan view of a disk drive bank with a refrigeration system according to the present invention;

FIG. 6 is an exploded view of a disk drive and thin plates of the system shown in FIG. 6;

FIG. 7 is another view of the refrigeration system of FIG. 5; and

DETAILED DESCRIPTION OF THE PREFERRED EMBODIMENT

Figure 1:
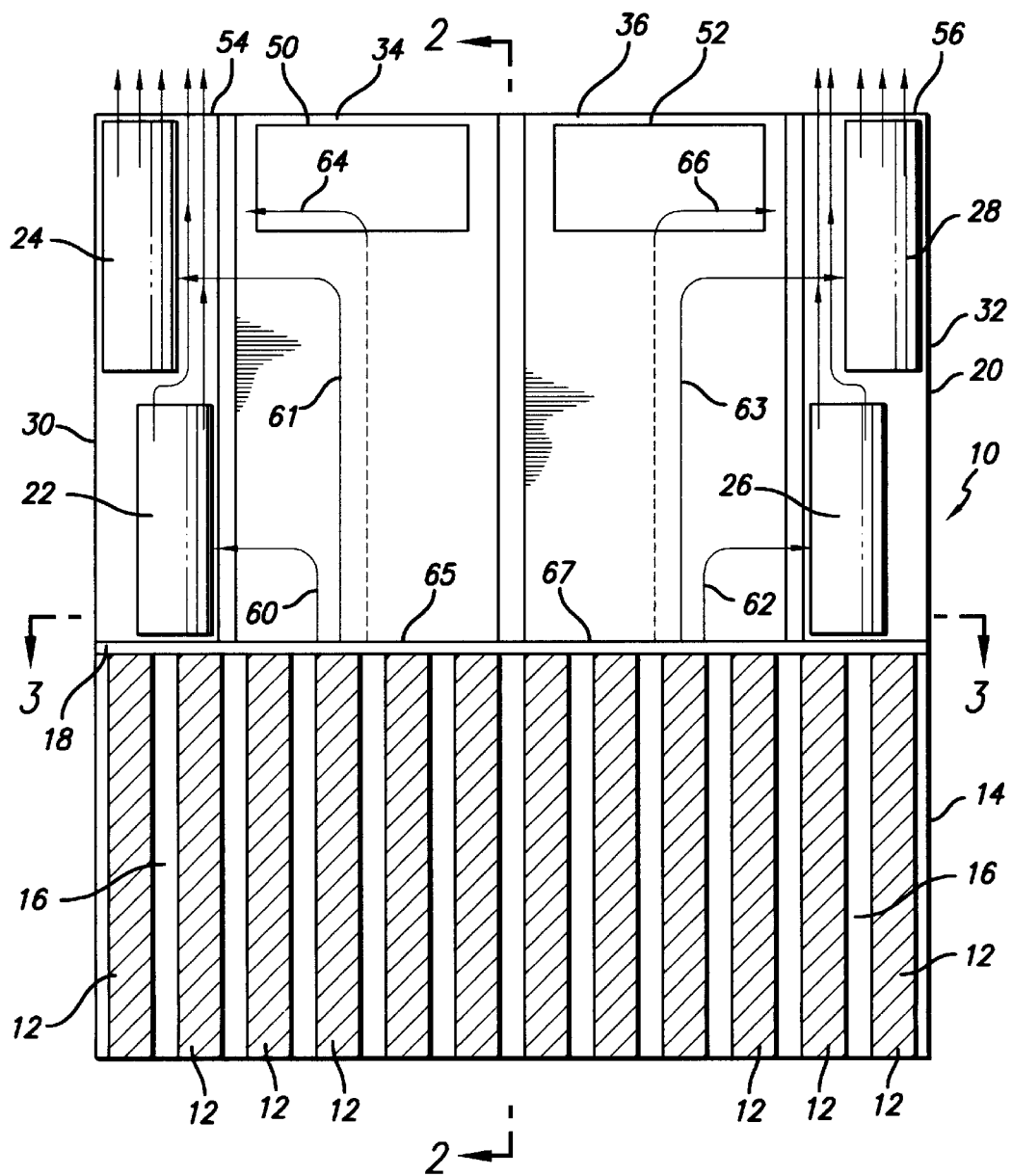
FIG. 1 is a top view of a disk drive storage utilizing a conventional cooling system.
Figure 2:
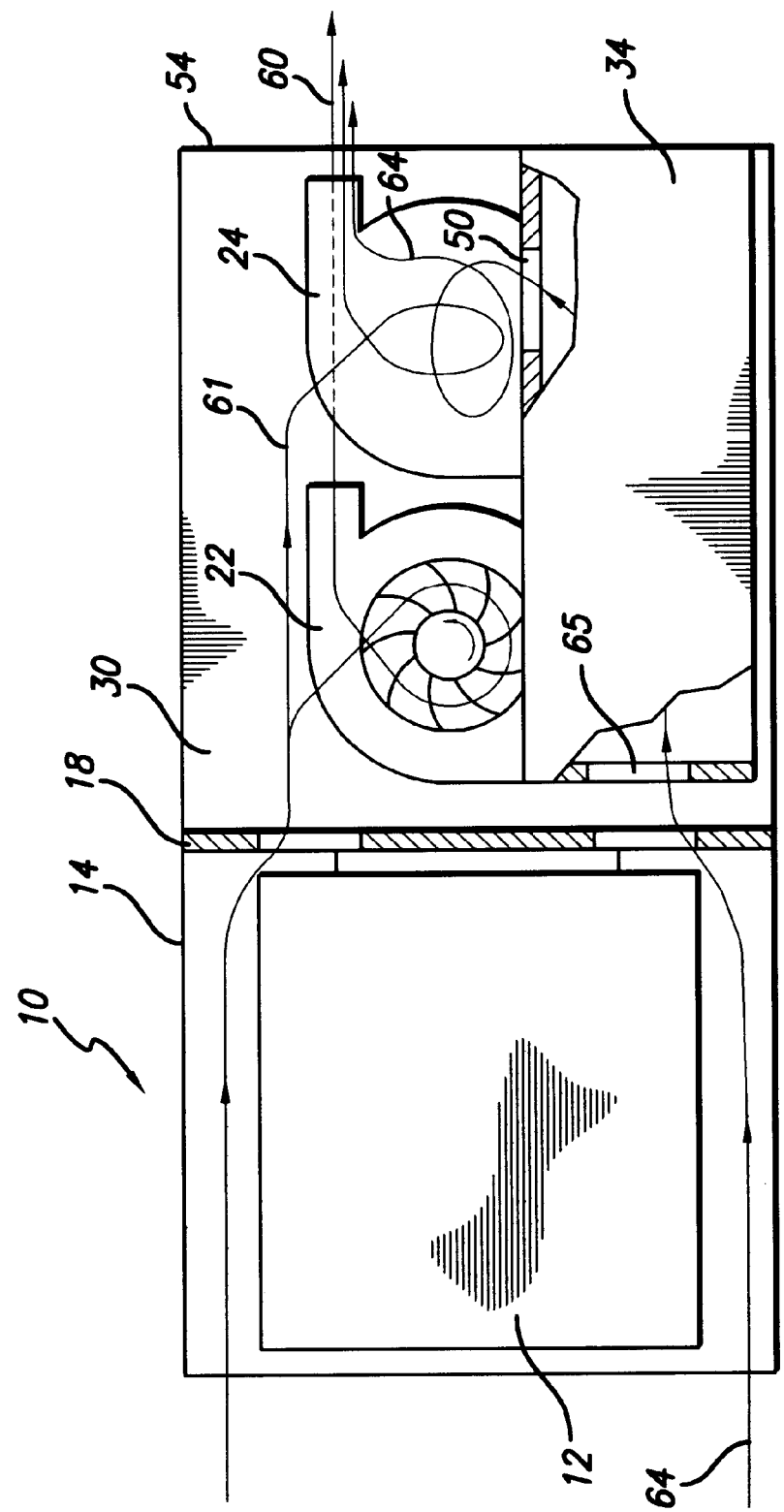
FIG. 2 is a cross-sectional view of the storage in FIG. 1 at line 2—2.
Figure 4:
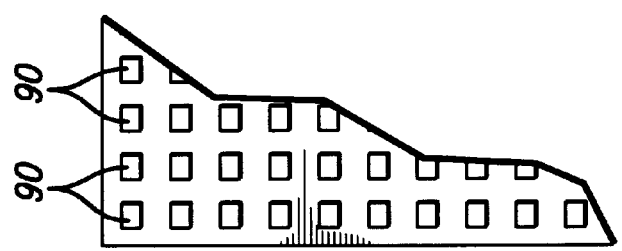
FIG. 4 is a front view of the pin fin heat sink of FIG. 3.
Figure 3:
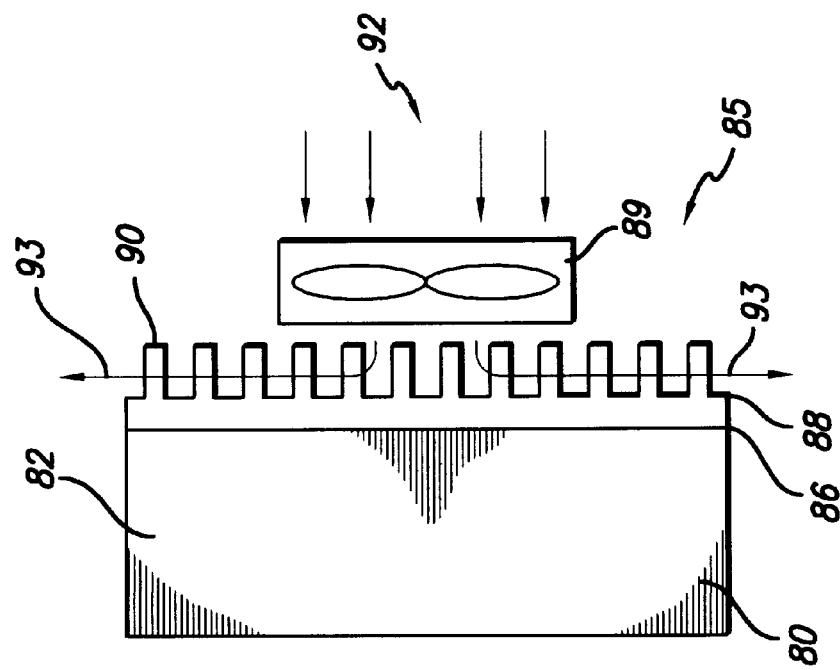
FIG. 3 is a side view of a disk drive having a pin fin heat sink.

In FIG. 5, a refrigeration system 100 for disk drives according to the present invention is shown. Fourteen 1 inch disk drives 102 are placed side by side with a pair of plates 104 sandwiching each disk drive 102. As noted above in the Background section, the conventional number of 1 inch disk drives is twelve. The provision of the refrigeration system 100 according to the present invention enables an increase in the disk drive density by 17% to fourteen disks. In the case of 1.6 inch drives, the normal capacity is eight disk drives. By employing the refrigeration system 100, it is possible to increase the capacity to nine drives, i.e., a 12.5% increase in storage capacity.

An exploded view of a single disk drive 102 with its plates 104 is shown in FIG. 6. Conduction plates, or heat conductors, 104 are provided for each disk drive 102. Along the back of the disk drives 102, an elongated back plane 106 is provided as shown in FIG. 5. Each of the thin conduction plates 104 is connected to a heat pipe 110, which in turn is connected to a chilled manifold or expansion chamber 108 through the back plane 106. The heat pipes 110 can be designed so that when a disk drive 102 is plugged in, the electrical connection and thermal conduction path to the chilled manifold 108 occur simultaneously. Making the thermal conduction path requires no other explicit manipulation by the user.

The thin conduction plates 104 adhered to the head disk assembly 130 and the controller board 132 of the disk drives 102 allow the heat generated by the disk drives 102 to be conducted to the chilled back plate 106. The thin conduction plates 104 and the back plate 106 are approximately 0.08 inch (2 mm) thick, and are made from an aluminum or copper material. The heat pipes 110 may be made of copper, brass and other materials having good heat conductivity. Here, the heat pipes 110 are a half inch to four inches in length and have diameters of about 0.08 inch to 0.28 inch (2–7 mm). In lieu of heat pipes 110, solid copper or aluminum pieces can be employed to conduct heat between the disk drives 102 and the chilled back plate 106. Such a solid copper or aluminum piece is short in length and may have any cross-sectional shape.

Figure 8:
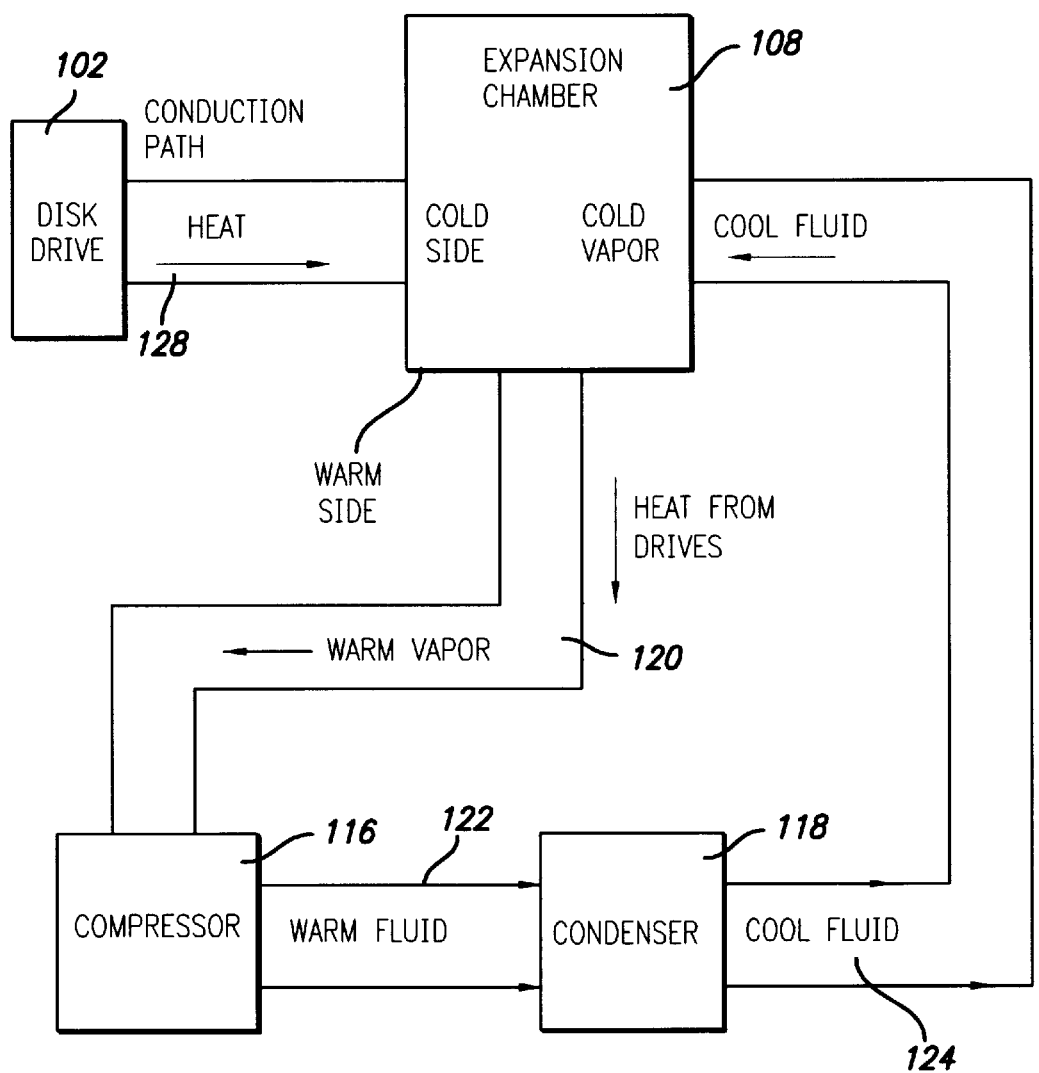
FIG. 8 is a schematic diagram of the refrigeration cycle used in the refrigeration system shown in FIG. 5.

Each of the heat pipes 110 is a heat pipe heat exchanger, which is a highly efficient passive device for transferring heat. Each of the heat pipes 110 is evacuated, and is charged with a precise amount of working fluid and sealed. Water or other working fluid can be used. In this system, one end connected to the disk drive 102 is a heat source and the other end connected to the back plate 106 is a heat sink. The working fluid on the warm side absorbs heat and boils. The vapor created by the boiling flows to the cold side where it condenses and releases heat. The condensed working fluid on the cold side is returned to complete the process. In this way, the heat pipes 110 function as a conduction path 128 as shown in FIG. 8. A heat pipe can operate with only a small temperature differential.

The chilled manifold 108 is maintained at a temperature that is below ambient. In FIG. 7, in the back of the chilled manifold 108, a refrigeration unit 112 is provided and is connected to the chilled manifold 108 via a thermal conduit 114. The chilled manifold 108 is refrigerated by vapor expansion and draws the heat conducted from the thin conduction plates 104 via the heat pipes 110.

A schematic diagram of the gas compression cycle is provided in FIG. 8. In the refrigeration unit 112, a compressor 116 and a condenser 118 are provided. The compressor 116 is used to move a volatile liquid used as a refrigerant, such as Freon R404A. The compressor 116 pumps the liquid from the chilled manifold 108 into the condenser 118. It then returns through the thermal conduit 114.

The refrigerant enters the chilled manifold 108 through the thermal conduit 114 and does so at low pressure. It causes the refrigerant to expand and vaporize inside the manifold 108. The expansion is called the Joule-Thompson expansion or Joule-Thompson process.

The warm refrigerant vapor then travels through a passage 120 and leaves the compressor 116 at high pressure at location 122. The compressor 116 pressurizes the vapor into a fluid. In the condenser 118, using an air mover and/or a heat exchange arrangement, the heat is removed from the fluid and is released into the air. The cool fluid in a passage 124, which is at or near the ambient room temperature, is transported to the expansion chamber 108. The fluid expands into the chamber 108 and in doing so, changes phase from a liquid to a gas. The temperature of the vapor drops below the temperature of the incoming fluid. The cycle is then repeated in this manner.

The refrigeration does not have to be limited to the above-described system. Any type of refrigeration can be employed as long as it has approximately the same refrigeration capability and can be employed to increase the disk drive density as in the above-described cooling system.

One of the major advantages of the refrigeration system according to the present invention is the increased number of disk drives. The storage capacity is increased from twelve 1 inch drives to fourteen 1 inch drives. For 1.6 inch drives, the capacity can be increased from eight drives to nine drives. They represent a 17% increase in a 1 inch drive system and a 12.5% increase in a 1.6 inch drive system.

Another advantage of the refrigeration system is that the temperature of the disk drives can be precisely controlled regardless of the ambient conditions. Disk drive temperatures can be maintained below those temperatures achieved through forced air cooling. Most disk drive manufacturers specify that the maximum head disk assembly temperature should not exceed 55° C. The refrigeration system allows the thin conduction plates 104 to be held at temperatures below 55° C. because they are thermally connected to the chilled manifold 108.

It is anticipated that future drives will require an increased amount of power and an even more efficient refrigeration system. Drives utilizing current technology dissipate 15 to 20 watts. It is estimated that the power of future drives will be as high as 40 watts. The refrigeration system according to the present invention will be able to adapt to a higher power consumption which generates more heat.

The refrigeration system described in FIGS. 5–8 employs a dedicated compressor/condenser unit to serve a disk drive storage having fourteen 1 inch disk drives. For larger storage products, the refrigeration system can be centrally located and support several banks of disk drives. The centralized refrigeration system is even more cost effective than a dedicated system because cost per drive is further reduced.

Another advantage of the described refrigeration system is that a disk drive can be simply plugged in and be automatically connected. There is no requirement for electrical re-wiring or other connecting work.

While specific embodiments of the invention have been described, it will be apparent that obvious variations and modifications of the invention will occur to those of ordinary skill in the art from a consideration of the foregoing description. It is therefore desired that the present invention be limited only by the appended claims and equivalents.

What is claimed is:

1. A refrigeration system for a disk drive bank comprising:
    a chilled manifold containing a refrigerant connected to the disk drive bank via heat pipes and for cooling the disk drive bank;
    a compressor coupled to the chilled manifold for pumping the refrigerant;
    a condenser coupled to the compressor for condensing the refrigerant and returning the refrigerant to the chilled manifold, wherein the refrigerant removes heat from the chilled manifold to the condenser; and
    a plurality of thin conductive plates wherein each of the thin conductive plates is connected to a corresponding one of the heat pipes.

2. A refrigeration system as claimed in claim 1, further comprising a back plate coupled to the chilled manifold.

3. A refrigeration system as claimed in claim 2, wherein the back plate is made of a thermally conductive material.

4. A refrigeration system as claimed in claim 2, wherein the back plate is coupled to the heat pipes and is disposed between the heat pipes and the chilled manifold.

5. A refrigeration system as claimed in claim 1, wherein the heat pipes conduct the heat from the disk drives to the chilled manifold.

6. A refrigeration system as claimed in claim 1, wherein the chilled manifold, the compressor and the condenser are dedicated to serve up to fourteen 1 inch disk drives or nine 1.6 inch disk drives disposed in the disk drive bank.

7. A mass storage system comprising:
    a set of up to fourteen 1 inch disk drives; and
    a refrigeration unit for cooling the disk drives including pairs of thin conduction means, each pair of the thin conduction means sandwiching corresponding one of the disk drives, vaporizing means coupled to the conduction means containing a refrigerant for transferring heat away from the disk drives, compression means for pumping the refrigerant away from and back to the vaporizing means, and condenser means for removing heat from the refrigerant and returning the cooled refrigerant to the vaporizing means.

8. A mass storage system as claimed in claim 7, further comprising a second set of up to fourteen 1 inch disk drives connected to the refrigeration unit wherein the refrigeration unit also cools the second set of disk drives.

9. A mass storage system as claimed in claim 7, comprising a plurality of heat pipes, each coupled to corresponding one of the thin conduction means at one end and the vaporizing means at the other end.

10. A mass storage system as claimed in claim 9, wherein the vaporizing means includes an aluminum back plate.

11. A mass storage system as claimed in claim 9, wherein the heat pipes are made of copper.

12. A mass storage system as claimed in claim 7, wherein the refrigerant is Freon.

13. A mass storage system as claimed in claim 7, wherein the refrigeration unit keeps the disk drives substantially at or below a predetermined temperature.

14. A mass storage system comprising:
    up to nine 1.6 inch disk drives;
    up to nine pairs of thin conducting plates, each pair sandwiching respective one of the nine 1.6 inch disk drives;
    up to nine pairs of heat pipes connected to the up to nine pairs of thin conducting plates respectively for conducting heat away therefrom; and
    refrigeration means defining a refrigerant passage for a refrigerant flow, the refrigeration means including an expansion chamber coupled to the heat pipes and containing a first portion of the refrigerant passage therein, a compressor containing a second portion of the refrigerant passage and circulating the refrigerant in the refrigerant passage, and a condenser containing a third portion of the refrigerant passage and for removing heat from the refrigerant.

15. A mass storage system as claimed in claim 14, wherein each of the thin conducting plates is approximately 2 mm in thickness.

16. A mass storage system as claimed in claim 14, wherein the refrigeration means includes an expansion valve for expanding the refrigerant into the expansion chamber.

17. A mass storage system as claimed in claim 14, wherein each of the disk drives has a control card side and a head disk assembly side, and wherein one of each pair of the thin conducting plates is coupled to the control card side and the other of said pair of the thin conducting plates is coupled to the head disk assembly side of the respective disk drive.

18. A mass storage system as claimed in claim 14, wherein the expansion chamber, the compressor and the condenser are fluidically connected.

* * * * *